(12) United States Patent
Blackmore et al.

(10) Patent No.: US 7,536,468 B2
(45) Date of Patent: May 19, 2009

(54) INTERFACE METHOD, SYSTEM, AND PROGRAM PRODUCT FOR FACILITATING LAYERING OF A DATA COMMUNICATIONS PROTOCOL OVER AN ACTIVE MESSAGE LAYER PROTOCOL

(75) Inventors: Robert S. Blackmore, Poughkeepsie, NY (US); Xin Chen, Poughkeepsie, NY (US); Scott D. Epter, Rhinebeck, NY (US); Chulho Kim, Poughkeepsie, NY (US); Rajeev Sivaram, West Orange, NJ (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 10/875,471

(22) Filed: Jun. 24, 2004

(65) Prior Publication Data
US 2006/0069788 A1   Mar. 30, 2006

(51) Int. Cl.
*G06F 15/16* (2006.01)
*H04L 12/28* (2006.01)

(52) U.S. Cl. ............... 709/230; 709/232; 709/234; 370/389

(58) Field of Classification Search ............... 709/230, 709/234, 232; 370/389
See application file for complete search history.

(56) References Cited

U.S. PATENT DOCUMENTS

| | | | | |
|---|---|---|---|---|
| 5,329,619 A * | 7/1994 | Page et al. | ............ | 709/203 |
| 5,426,694 A * | 6/1995 | Hebert | ............ | 379/242 |
| 6,038,604 A * | 3/2000 | Bender et al. | ............ | 709/233 |
| 6,070,189 A | 5/2000 | Bender et al. | ............ | 709/224 |
| 6,078,747 A | 6/2000 | Jewitt | ............ | 395/712 |
| 6,111,894 A | 8/2000 | Bender et al. | ............ | 370/469 |
| 6,608,892 B2 * | 8/2003 | Shaffer et al. | ............ | 379/207.12 |
| 2002/0099858 A1 * | 7/2002 | Lindo et al. | ............ | 709/250 |
| 2003/0187915 A1 | 10/2003 | Sun et al. | ............ | 709/201 |
| 2003/0225922 A1 | 12/2003 | Fletcher | ............ | 709/312 |
| 2003/0225932 A1 | 12/2003 | Bae et al. | ............ | 709/321 |

OTHER PUBLICATIONS

Banikazemi, M., et al., "MPI-LAPI: an efficient implementation of MPI for IBM RS/6000 SP systems," Parallel and Distributed Systems, IEEE Transactions on, vol. 12, Iss. 10, Oct. 2001, pp. 1081-1093.

Lauria, M. and Chien, A., "MPI-FM: High Performance MPI on Workstation Clusters," Journal of Parallel and Distributed Computing, vol. 40, No. 1, 1997, pp. 4-18.

(Continued)

*Primary Examiner*—William C Vaughn, Jr.
*Assistant Examiner*—Ranodhi N Serrao
(74) *Attorney, Agent, or Firm*—Geraldine Monteleone, Esq.; Kevin P. Radigan, Esq.; Heslin Rothenberg Farley & Mesiti, P.C.

(57) ABSTRACT

A protocol interface is provided for an active message protocol of a computing environment and a client process employing the active message protocol. The protocol interface includes an interface to a header handler function associated with the client process. The interface to the header handler function has parameters to be passed by and a parameter to be returned to the active message protocol when processing a message received through the active message protocol. The parameters to be passed include current message state information and current message type information for the received message. These parameters facilitate message-specific decisions by the header handler function about processing data of the message by the active message protocol. The parameter to be returned to the active message protocol instructs the active message protocol how to process the received message other than just where to store the message.

14 Claims, 3 Drawing Sheets

OTHER PUBLICATIONS

"Dynamic Application Communications Interface Management Dynamic Communication Protocol/Transport Management And Dynamic Communication Profile Management," IBM Technical Disclosure Bulletin, vol. 34, No. 7A, Dec. 1991, pp. 42-45.

* cited by examiner

INTERFACE METHOD, SYSTEM, AND PROGRAM PRODUCT FOR FACILITATING LAYERING OF A DATA COMMUNICATIONS PROTOCOL OVER AN ACTIVE MESSAGE LAYER PROTOCOL

TECHNICAL FIELD

This invention relates in general to communications protocols for computing environments, and more particularly, to a technique for interfacing a protocol for facilitating communications within a computing environment with a client process which employs an active message protocol.

BACKGROUND OF THE INVENTION

Protocol layering is fairly common in computer communications over data networks. For example, the well-known protocols used for data communications over the Internet, TCP/IP, consist of various protocol layers stacked on top of one another. Each protocol layer offers its clients differing functionalities and communication performance. Such layering is typically used, among other things, to insulate software layers which utilize protocols for reliable communication from the physical hardware details that must be considered for actually sending digital data over the network.

Another example of protocol layering in high-performance parallel systems is utilized in IBM's RS/6000® SP™ systems. (IBM and RS/6000 are registered trademarks of International Business Machines. SP is a common law trademark of International Business Machines.) In this example, two messaging layer protocols are provided in IBM® RS/6000® SP™ systems. These messaging layer protocols are a Message Passing Interface (MPI) and a low-level application program interface (LAPI). (Low-level application program interface and LAPI are trademarks of International Business Machines Corporation.) Each of these message layer protocols has a separate application program interface (API) that can be accessed from a user program. Each of these protocol layers sits on top of a Hardware Abstraction Layer (HAL) interface that interacts with the network interface and device driver to send the data over the physical network. The HAL interface provides both MPI and LAPI with a standard interface library that hides implementation details of the network interface and device driver from both MPI and LAPI. MPI provides users with a two-sided communication model using an industry-standard API. LAPI provides users with an active message interface that is inherently one-sided and asynchronous; it provides users with enhanced communication performance with a custom IBM API.

Layering an industry-standard message layer protocol, such as MPI, over LAPI can provide users with many of LAPI's performance advantages while coding to an industry standard. An interface to LAPI which facilitates layering MPI over LAPI is provided by enabling LAPI to call routines provided by a client MPI program to process the data of messages received by LAPI which are addressed to the client MPI program. However, enhancements to the interface of an active message layer protocol which facilitate such layering can improve data communications efficiency where an active message layer protocol such as LAPI serves as a substrate messaging layer protocol for other message-layer protocol implementations, such as MPI protocol implementations.

SUMMARY OF THE INVENTION

The shortcomings of the prior art are overcome and additional advantages are provided through the provision of a protocol interface method for a computing environment having an active message protocol for facilitating communications within the computing environment and a client process employing the active message protocol. In one aspect, the method comprises providing an interface to a header handler function associated with the client process, and the interface to the header handler function comprises parameters to be passed by and a parameter to be returned to the active message protocol when processing a message received through the active message protocol. The parameters to be passed comprise current message state information and current message type information for the received message, and the current message state information and current message type information facilitate message-specific decisions by the header handler function about processing data of the message by the active message protocol. The parameter to be returned, when received by the active message protocol, instructs the active message protocol on processing the message wherein the instructed processing of the message is other than just storing the message.

In another aspect, the protocol interface method further comprises providing an interface to a completion handler function associated with the client process, wherein the interface to the header handler function further comprises a completion handler execution flag to be returned by the header handler function to the active message protocol. The completion handler execution flag instructs the active message protocol whether to execute the completion handler function in the thread of the active message protocol which received a last packet of the message or whether to queue the completion handler function for execution by a separate thread.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, a data handling interface is provided between an active message protocol and a client process in a computing environment. The interface employs header handler and completion handler functions provided by the client process, and allows the client process to obtain the benefits of employing the active message protocol layer, while still tailoring utilization of computing environment resources in a manner that supports an objective of the client process.

When a client process is layered over an active message protocol, in accordance with an aspect of the present invention, the active message protocol calls a header handler function upon receiving a first packet of a message. The parameters passed to the called header handler function facilitate the making of message-specific decisions by the header handler function about the processing of data of the message to be done by the active message protocol. These decisions are communicated to the active message protocol via a returned parameter that instructs the active message protocol how to handle the current message. In particular, the client process may instruct the active message protocol, via the returned parameter, to process the data of the current message in a manner other than merely transferring the message to a buffer accessible to the client process. By instructing the active message protocol to process a received message in some manner other than simply storing it, the client process can tailor the behavior of the active message protocol and thereby affect the utilization of computing environment resources in accordance with present objectives of the client process.

Figure 1:
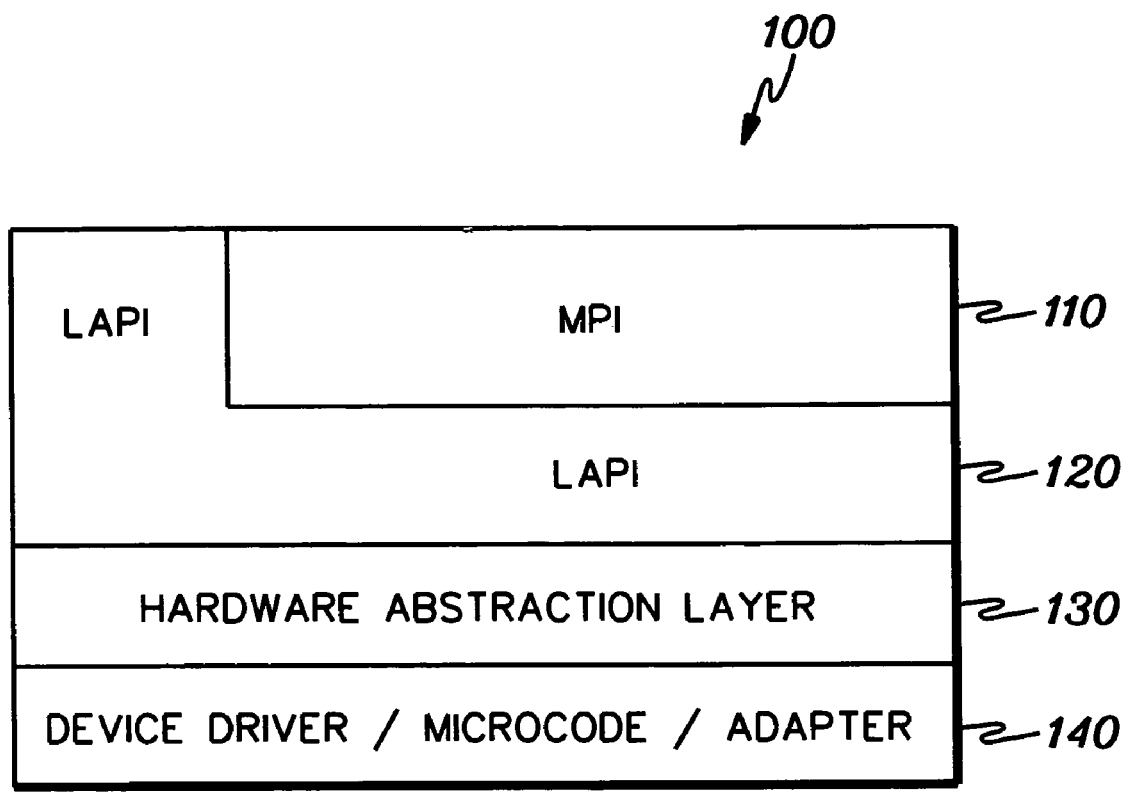
FIG. 1 illustrates one example of a protocol stack in a computing environment in which a Message Passing Interface protocol is layered over an active message protocol, in accordance with an aspect of the present invention.

FIG. 1 illustrates one example of a protocol stack 100 in a computing environment in which a Message Passing Interface protocol is layered over an active message protocol (IBM's RS/6000® SP™ system, for example), in accordance with an aspect of the present invention. In this example, protocol stack 100 comprises Message Passing Interface (MPI) protocol 110, low-level application program interface (LAPI) protocol 120, which is an example of an active message layer protocol, hardware abstraction layer (HAL) interface 130, and device driver 140. As shown, a message that is to be communicated using MPI protocol 110 is also handled by LAPI protocol 120 because LAPI protocol 120 interfaces MPI protocol 110 and HAL interface 130 in this example. Similarly, HAL interface 130 provides the interface to device driver 140 for messages communicated using LAPI protocol 120. In this example, LAPI protocol 120 also borders the top of the protocol stack so that LAPI protocol 120 can be used directly by a client process to send or receive a message.

MPI protocol 110 is one example of an industry-standard, two-sided communication protocol. A two-sided communications protocol requires both the sending node of a computer environment and the receiving node to take action before a data message transfer between them can be completed. Generally, the sending node calls a send routine to start message transmission, and the receiving node calls a corresponding receive routine to designate buffer space for storing the data message to be transferred. Message transfer into the designated target data buffers is only completed after the receive routine explicitly indicates the receiving node's readiness to receive the current message. In one example of a two-sided communications protocol, the sending node notifies the receiving node that it has a message to send via a control message. The receiving node designates buffer space for storing the data message to be transferred and replies to the sending node via a control message that the receiving node is ready to receive the data message. Thereafter, the sending node sends the data message to the receiving node.

In general, an active message layer protocol is a one-sided communications protocol. In contrast to a two-sided communications protocol, a one-sided communications protocol does not require both the sending node of a computer environment and the receiving node to take action before a data message transfer between them can be completed. Instead, the sending node using the one-sided communication protocol simply transmits a data message to the receiving node when the sending node has a data message to send. Both one-sided and two-sided communication protocols often provide communication reliability by requiring the retransmission of packets of a message that are not acknowledged by the receiving node or retransmission of packets for which the receiving node requests retransmission. The receiving node may request retransmission of a packet that is known to have been corrupted in transmission (for example). As one with ordinary skill in the art would readily recognize, although FIG. 1 illustrates LAPI protocol 120 between the MPI and HAL layers in protocol stack 100, other active message layer protocols could be used.

Hardware abstraction layer protocol 130 interacts with the LAPI protocol 120 and device driver 140 to send a data message over the physical network. In an IBM SP™ system, for example, the HAL interface provides a standard interface library that hides the implementation details of communication over the physical network from the software layers located above it in the protocol stack. Device driver 140 includes microcode and a hardware adapter for interfacing the stack to the physical communications network.

The HAL interface is described, for example, in U.S. Pat. No. 6,111,894 for HARDWARE INTERFACE BETWEEN A SWITCH ADAPTER AND A COMMUNICATIONS SUBSYSTEM IN A DATA PROCESSING SYSTEM, which is hereby incorporated by reference. The MPI protocol is described, for example, in MPI: A Message-Passing Interface Standard by the Message Passing Interface Forum, March 1994, which is hereby incorporated by reference. One embodiment of the LAPI protocol is described in U.S. Pat. No. 6,038,604 for METHOD AND APPARTATUS FOR EFFICIENT COMMUNICATIONS USING ACTIVE MESSAGES, which is hereby incorporated by reference.

Figure 2:
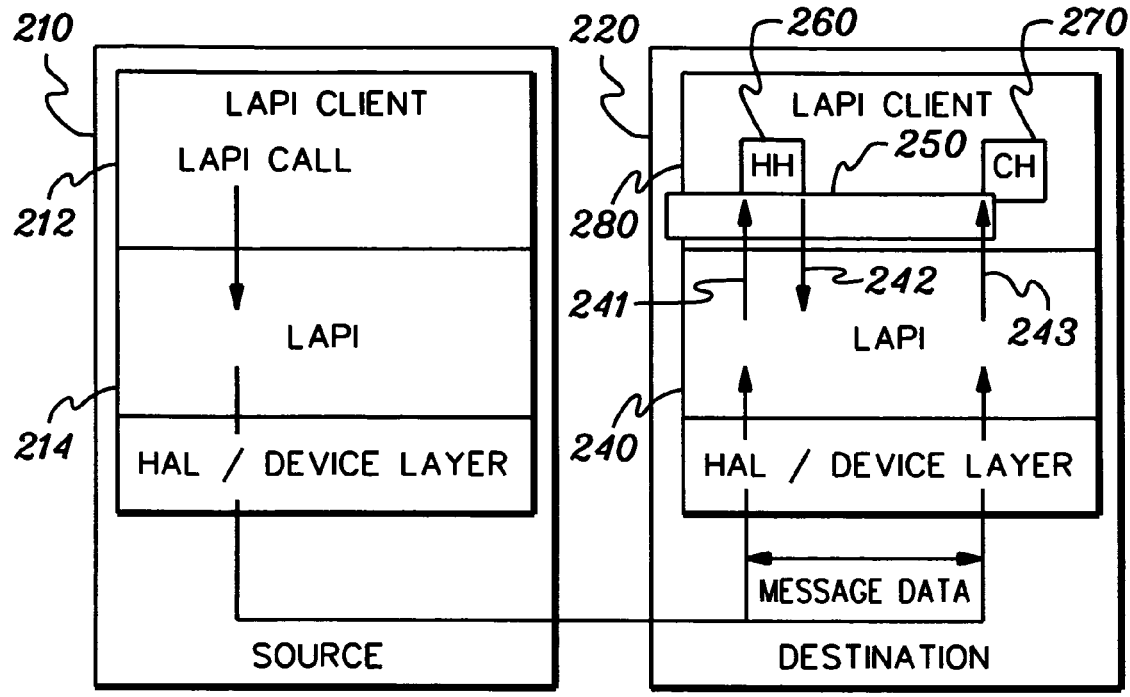
FIG. 2 illustrates one example of (matching) protocol stacks used by a source node and a destination node of a computing environment and one embodiment of an interface between an active message protocol and a client process, in accordance with an aspect of the present invention.

FIG. 2 illustrates one example of (matching) protocol stacks used by a source node and a destination node of a computing environment and one embodiment of a communications interface protocol between an active message protocol and a client process, in accordance with an aspect of the present invention.

When a client message is sent from a source node 210 to a destination node 220 of a computing environment using an active message protocol, the resulting message from the source's active message protocol 214, the LAPI protocol in the example shown in FIG. 2, is formatted to include the address of a header handler function 260 at destination node 220. After the first packet of the message arrives at the destination node, header handler function 260 is executed to store message data into the target task.

The header handler function, which is defined in a client program 280 (e.g., LAPI client) of destination node 220, returns a virtual address in the target address space via information exchange 242 where the destination node's active message protocol 240, the LAPI protocol in the example shown in FIG. 2, is to store the received message data. This address is stored in internal structures of the destination node's active message protocol, and arriving message packets are stored at offsets from this address. Header handler function 260 may also return the address of a completion handler function 270 that active message protocol 240 executes on behalf of its client (client program 280) when all packets of a message have arrived. Also, client program 280 may take actions to further process the message after the message data has arrived at the destination node.

FIG. 2 also shows one example of the flow of information between various protocol layers involved when a message is sent from source client program 212 to destination client program 280 using an active message protocol in accordance with an aspect of the present invention. First, source client program 212 passes a client message to the source's active message protocol 214. The source's active message protocol 214 sends a message comprising the data of the client message to the destination node's active message protocol 240 via the hardware abstraction layer protocol and device layer of the communication network. Once the first packet of the message is received by the destination node's active message protocol 240, a protocol interface 250 (in accordance with an aspect of the present invention) is utilized to facilitate processing the data of the message by the destination node's active message protocol 240.

Protocol interface 250 comprises information exchange 241 and information exchange 242 between the destination node's active message protocol 240 and header handler function 260. In another aspect, protocol interface 250 further comprises information exchange 243 between the destination node's active message protocol 240 and the completion handler function 270 of the receiving client program 280. The contents of information exchanges 241, 242, and 243 aspects of the present invention and are described in more detail below.

In one embodiment of the present invention, information exchange 241 comprises current message state information and current message type information for the most recently received message. This current message state information includes message length, message source identification, and, for a single-packet message, a pointer to the message data in a receiver buffer. Message type information, which can include whether the message comprises a single packet or multiple packets, can be defined by the source client program. Message type information can also indicate whether the message is contiguous or non-contiguous. As another example, MPI as the source client program can identify a message as a control message or a data message.

In one embodiment, information exchange 242 comprises a returned parameter that instructs the destination node's active message protocol 240 how to process the message. This processing is other than simply instructing the active message protocol on where to store the current message. In one example, the parameter returned by header handler function 260 to the destination node's active message protocol 240 instructs the destination node's active message protocol to drop a packet of the message so that the packet will be retransmitted by the source's active message protocol 214 at a later time. In another example, the parameter returned by header handler function 260 to the destination node's active message protocol 240 can instruct the destination node's active message protocol to "bury" the message being received. The destination node's active message protocol 240 then discards the current message in response to the "bury" instruction and acknowledges receipt of the message so that the source node's active message protocol will not retransmit the message at a later time. In a further example, the parameter returned by header handler function 260 to the destination node's active message protocol 240 could give the destination node's active message protocol the address of special data-scatter instructions, which tell the active message protocol how to operate on, optionally, and distribute the data of the current message into non-contiguous user buffers.

In another embodiment, information exchange 242 further comprises another returned parameter that indicates the completion handler function to be executed by the destination node's active message protocol 240 and, in accordance with an aspect the present invention, a completion handler execution flag. The indicated completion handler function is to be executed by the destination node's active message protocol after the destination node's active message protocol receives the last packet of the message currently being received. In accordance with an aspect of the present invention, the completion handler execution flag instructs the active message protocol whether to execute the completion handler function "in-line", i.e. in the program thread that received the last packet of the message, or whether to queue the completion handler function for execution in a separate program thread. Generally, execution of the header handler function "in-line" by the destination node's active message protocol reduces the latency associated with completing the communication of messages between the source node and destination node via the active message protocol.

The information exchanges between the destination node's active message protocol 240 and destination client program 280 via protocol interface 250 (to header handler function 260 and completion handler function 270), in accordance with an aspect of the present invention, can benefit active message protocol clients in general, but are particularly useful in efficiently layering protocols like MPI over LAPI.

The Message Passing Interface (MPI) uses a two sided communication model where the message initiator (or sending node) calls a send routine to start message transmission and the receiver (or receiving node) issues a corresponding receive call to actually receive the message data into the target buffers. Message transfer into the target data buffers is only completed after the receiving side program (or task) explicitly indicates its readiness to receive the current message by making a MPI receive call. Since the sending and receiving tasks are asynchronous, MPI addresses the scenario where message data may arrive before the target (receiver) task has made a receive call.

MPI has two internal protocols to address sender/receiver asynchrony. (MPI's Eager Protocol and Rendezvous Protocol, which address sender/receiver asynchrony, are described briefly in Banikazemi, M., et al., "MPI-LAPI: an efficient implementation of MPI for IBM RS/6000 SP systems," Parallel and Distributed Systems, IEEE Transactions on, Vol. 12, Iss. 10, October 2001, pp. 1081-1093.) For small messages, MPI maintains a buffer called the early arrival buffer and uses the MPI Eager Protocol to transfer the message. When the message data arrives at the target, if an indication of the target's readiness to receive is not already posted and if there is space in the early arrival buffer, the message data is stored in the early arrival buffer. When a ready-to-receive indication is eventually posted, the early arrival buffer is searched to see whether a matching arrival exists. If so, the message is copied from the early arrival buffer into the target buffers to complete message communication. For large messages, MPI uses a Rendezvous Protocol to first synchronize the source and target tasks. The MPI Rendezvous Protocol initiates communication only after both sender and receiver are ready and have made corresponding send and receive calls. MPI control communication is performed to facilitate this synchronization by sending a message from the source (i.e., the sender), checking to see whether a ready-to-receive indication has been posted at the receiver, and sending a control message back from the receiver if the receiver is ready. The source initiates communication of the large message after the source receives the receiver's control message indicating that the receiver is ready to receive.

Figure 3:
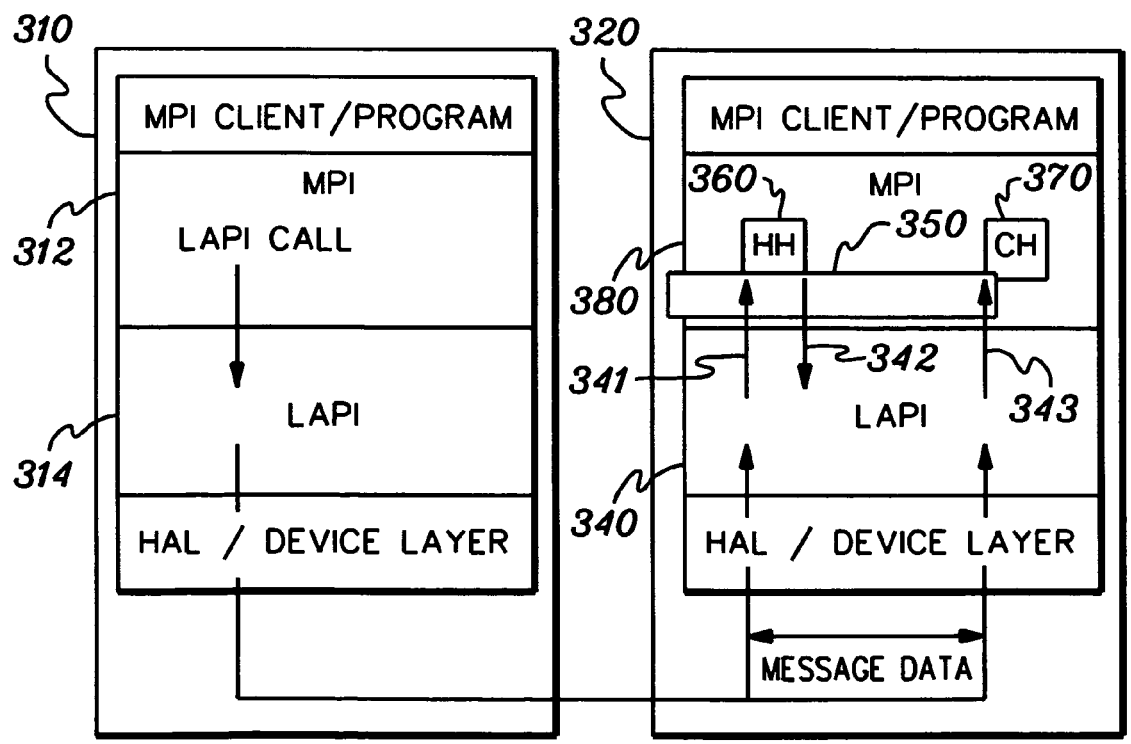
FIG. 3 illustrates another example of matching protocol stacks for message communication in a source node and a destination node of a computing environment, wherein an enhanced LAPI protocol includes an interface to the Message Passing Interface protocol, in accordance with an aspect of the present invention.

FIG. 3 illustrates another example of matching protocol stacks for message communication in a source node and a destination node of a computing environment. In this example, a client program at the source node utilizes the Message Passing Interface protocol, which is layered over an active message protocol, to send messages to a client program at the destination node. FIG. 3 also illustrates an interface between an enhanced LAPI protocol and the Message Passing Interface protocol in accordance with an aspect of the present invention. When MPI is layered over LAPI, which is one example of an active message protocol, MPI uses LAPI to communicate control messages as well as data messages. MPI thus serves as a LAPI client, giving rise to the communication protocol stack illustrated in FIG. 3. The resulting communication protocol stacks in the sending and receiving nodes comprise, in order from top to bottom, an MPI client program, MPI, LAPI, and a layer comprising a hardware abstraction layer and device layer.

When the MPI protocol communicates via its Eager Protocol, an MPI process at a sending node 310 uses a LAPI active message call to the sending node's LAPI process 314 to send message data to a destination MPI process 380 at a receiving node 320. The source MPI process 312 specifies a header handler function 360 to be invoked by the receiving node's LAPI process 340. The invoked header handler function receives parameters from the receiving node's LAPI. The parameters 341 passed from the receiving node's LAPI to the header handler function 360 of the receiving node's MPI include message state information and current message type information for the current message. The message state information includes message characteristics like message source and message length. The receiver's header handler function 360 checks to see whether a ready-to-receive indicator has posted for the current message and whether space exists in the early arrival buffer.

The receiver's header handler function 360 then utilizes the current message state information and current message type information to facilitate making message-specific decisions about how the receiving node's active message protocol (LAPI in this example) is to process the message. Depending on the state of the target task among other things, the header handler function 360 may take one of the following actions: (1) if a ready-to-receive indication has been posted, return the address of the target task buffer that is the message's final destination; (2) if a ready-to-receive indication has not been posted, and space exists in the early arrival buffer, return an address in the early arrival buffer where message data can be temporarily stored; and (3) if a ready-to-receive indication has not been posted and if no space exists in the early arrival buffer, instruct LAPI how to process the current message. In accordance with an aspect of the present invention, this instruction to LAPI is represented by one of the parameters 342 that are returned from header handler function 360 to the receiving node's LAPI process 340. The instructions given to receiving node's LAPI process 340 include an instruction to drop the current packet of the message and retransmit the current packet later. Alternatively, the header handler function 360 may return an instruction to the receiving node's LAPI process 340 to bury the message and a completion handler function address. The specified completion handler function 370 is executed by the receiving node's LAPI process after receiving the entire message. In one example, the specified completion handler function sends messages to the source to inform the source about the filled state of the early arrival buffers at the target and to identify the message that was buried so the message will not be retransmitted by the sender's MPI protocol.

In addition, the receiver's MPI returns a completion handler execution flag, as another of the parameters 342, to the receiver's LAPI process. The value of the completion handler execution flag instructs the receiver's LAPI process whether to execute the specified completion handler function "in-line" or whether to queue the specified completion handler function for execution in a separate thread of the LAPI process. "In-line" execution of the completion handler function is defined as executing the completion handler function in the same thread of the LAPI process that received the last packet of the current message. LAPI executes the completion handler function after receiving the entire message and transferring the message to the appropriate buffer. When the receiving node's LAPI process invokes completion handler function 370, it passes a client-completion-handler parameter 343, which was returned by header handler function 360 as one of the parameters 342, to completion handler 370. In one example, the completion handler function sends a control message that supports the MPI protocol. An example of such a control message is the return of flow control tokens used by the MPI protocol. Parameters 341, 342, and 343 are part of a protocol interface 350 in accordance with an aspect of the present invention.

Figure 4:
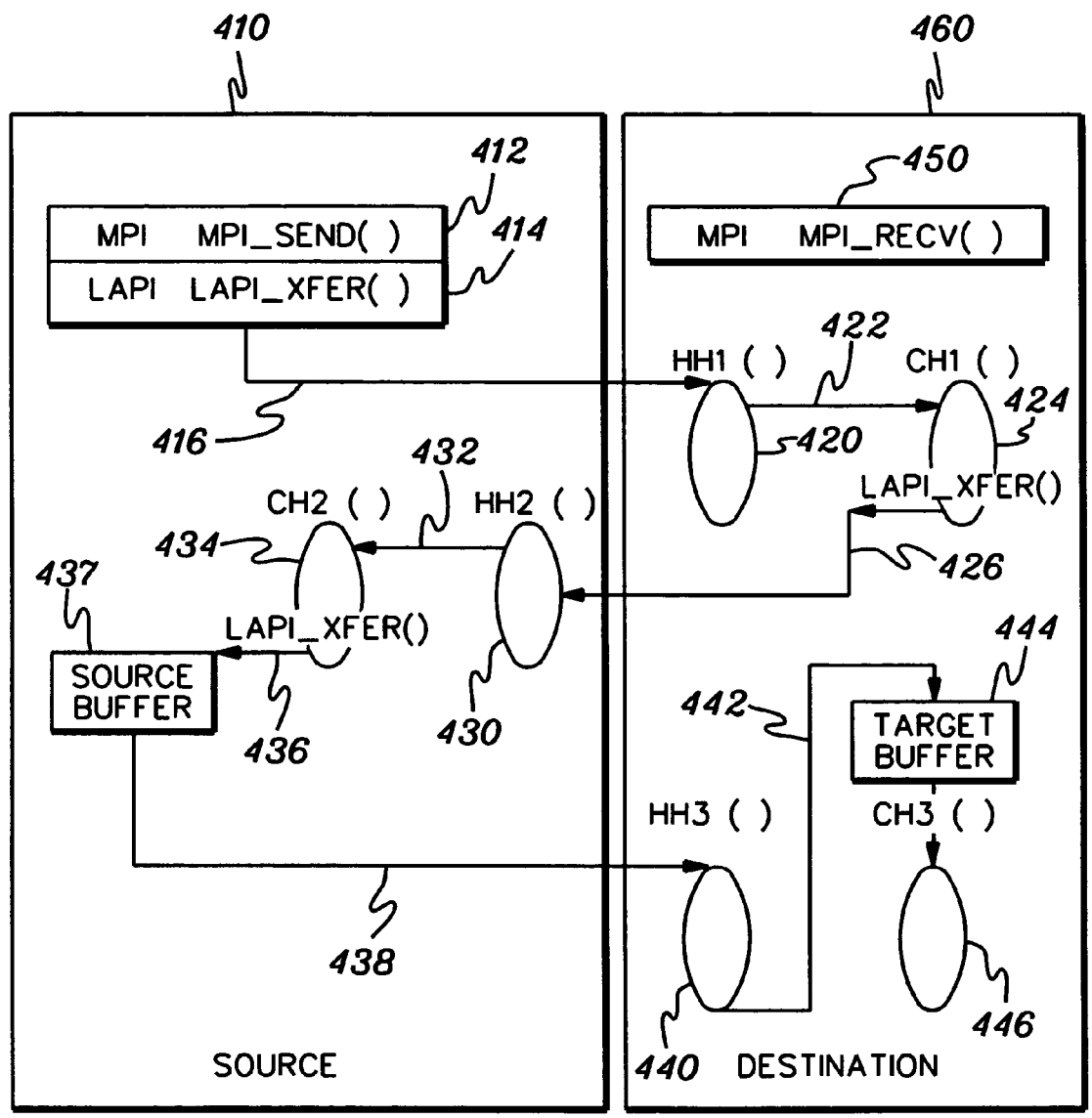
FIG. 4 illustrates an example of the interaction of the Message Passing Interface protocol and an active message protocol for the transfer of a message in the computing environment using the Rendezvous Protocol of the Message Passing Interface protocol, in accordance with an aspect of the present invention.

FIG. 4 illustrates an example of the interaction of the Message Passing Interface protocol and an active message protocol for the transfer of a message in a computing environment using the Rendezvous Protocol of the Message Passing Interface protocol, in accordance with an aspect of the present invention. MPI control communications are sent via LAPI messages 416 and 426. Paths 422, 432, and 436 show internal temporal dependencies in the active message protocol processing at the sending node and receiving nodes. MPI message data are sent via LAPI messages 438. From a LAPI perspective, there is no difference between MPI control and data messages. They are just LAPI messages which carry different addresses for different header handler functions that will process the LAPI messages differently.

When the MPI protocol process at a source node 410 communicates via its Rendezvous Protocol with the MPI protocol process at a destination node 460, source node MPI 412 uses a LAPI active message call 414 to send a control message 416 from the source node 410 to the destination node 460 to verify whether destination node MPI 450 has posted an indication that destination node MPI 450 is ready to receive a large message. Control message 416 designates a header handler function HH1 that the destination node's active message protocol is to invoke after it receives the header packet of control message 416. After the destination node's active message protocol (e.g. LAPI) receives the header packet of control message 416, the destination node's active message protocol invokes header handler function HH1 420, which examines the received control message and the state of destination node MPI 450 to see whether a ready-to-receive indication has been posted for this message.

If a ready-to-receive indication has been posted by destination node MPI 450, header handler function HH1 specifies completion handler function CH1 and requests that completion handler function CH1 be executed inline via a parameter and a completion handler execution flag, which are returned to the destination node's active message protocol 422. Alternatively, if a ready-to-receive indication has not been posted, header handler function HH1 returns an instruction to the destination node's LAPI via a returned parameter requesting that control message 416 be dropped and retransmitted later 422.

If a ready-to-receive indication for this message has been posted, the destination node MPI instructs the destination node's active message protocol (LAPI in this example) to send a control message to the source node MPI via the source node's LAPI to indicate that the source node may begin transmitting the large message. Inline execution of the completion handler by the destination node's LAPI 424 tends to reduce latency in completing the communication of a message where MPI is layered over an active message protocol because the source node 410 does not begin to transmit the data of a large message until the source node MPI receives control message 426 (via the source node's LAPI), indicating that the destination node is ready to receive a large message, when source node MPI 412 uses its Rendezvous Protocol mode.

When the source node receives the control message 426 indicating receiver readiness, the source node's LAPI invokes a header handler function HH2 430, which returns a completion handler function CH2 address as a parameter 432. The source node's LAPI then invokes the designated completion handler function (CH2) 434. Completion handler CH2 initiates the actual MPI data message transfer by making another LAPI routine call 436. The called LAPI_XFER( ) routine transmits data stored in source buffer 437 to destination node 460 via data message 438. Again, execution of the completion handler function inline 434 after the source node's LAPI has received a control message from the destination node indicating the destination node's readiness to receive a message tends to reduce the latency in completing the communication of a MPI message using an active message protocol like LAPI.

After data message 438 arrives at the destination node, the destination node's LAPI process invokes the header handler function designated in data message 438, HH3 440. Header handler function HH3 returns the following to the destination node's LAPI process: the address of a target buffer 444 in the target task, the address of a completion handler function, and a completion handler execution flag. Data message 438 is stored directly into target buffer 444 by the destination node's LAPI process 442 as instructed by header handler function HH3. Then, after all packets of data message 438 have been received by the destination node, the designated completion handler function, CH3, is then executed by the destination node's LAPI 446. Header handler function HH3 determines whether to instruct the destination node's LAPI to execute completion handler CH3 inline or to queue completion handler CH3 for execution in a separate thread based on the extent of communication and cleanup anticipated.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A protocol interface method for interfacing an active message protocol and a client process in a computing environment, the method comprising:

providing an interface to a header handler function associated with the client process, the interface comprising parameters to be passed from the active message protocol to the header handler function when processing a message received through the active message protocol and a parameter to be returned to the active message protocol from the header handler function in response thereto;

the parameters to be passed comprising current message state information and current message type information for the message, the current message state information and the current message type information facilitating message-specific decisions by the header handler function about processing data of the message by the active message protocol;

the parameter to be returned, when received by the active message protocol, instructing the active message protocol on processing the message, the processing of the message being other than just storing the message;

wherein the instructing comprises instructing the active message protocol how to scatter the data of the message into non-contiguous buffers, the non-contiguous buffers being accessible to the client process, wherein the client process tailors functioning of the active message protocol for this message through the parameter returned from the header handler function to the active message protocol, which specifies how to scatter the date into non-contiguous buffers; and wherein the method further comprises providing an interface to a completion handler function associated with the client process, and wherein the interface to the header handler function further comprises a completion handler execution flag to be returned by the header handler function to the active message protocol, the completion handler execution flag instructing the active message protocol to execute the completion handler function in a thread of the active message protocol after the active message protocol receives data associated the message, wherein the thread received a last packet of the message.

2. The method of claim 1, wherein the message comprises at least one data packet, and the parameters to be passed further comprise a pointer to the at least one data packet of the message held in a receiver buffer, the pointer facilitating expedited access to the at least one data packet by the client process.

3. The method of claim 1, wherein the completion handler execution flag instructs the active message protocol to execute the completion handler function in the thread if the completion handler execution flag returned has a defined value, and the completion handler execution flag instructs the active message protocol to queue the completion handler function for execution by a separate thread if the completion handler execution flag returned has other than the defined value.

4. The method of claim 1, wherein the instructing comprises instructing the active message protocol to at least one of:
  drop a packet of the message, request retransmission of the packet, and invoke the header handler function upon receipt of the retransmission of the packet; or
  bury a packet of the message and treat the message as having been received with respect to the active message protocol.

5. The method of claim 1, wherein the instructing further comprises referring the active message protocol to special data-scatter instructions, the special data-scatter instructions specifying how to operate on the data of the message and how the data of the message is to be scattered into the non-contiguous buffers.

6. A computing system comprising:
  a computer comprising a processor and a memory unit, the computer further comprising:
  an active message protocol for facilitating communications within the computing system, the active message protocol including an interface to a header handler function associated with a client process of the computing system, the interface comprising parameters to be passed from the active message protocol to the header handler function when processing a message received through the active message protocol and a parameter to be returned to the active message protocol from the header handler function in response thereto;
  the parameters to be passed comprising current message state information and current message type information for the message, the current message state information and the current message type information facilitating message-specific decisions by the header handler function about processing data of the message by the active message protocol;
  the parameter to be returned, when received by the active message protocol, instructing the active message protocol on processing the message, the processing of the message being other than just storing the message;
  wherein the instructing comprises instructing the active message protocol how to scatter the data of the message into non-contiguous buffers, the non-contiguous buffers being accessible to the client process, wherein the client process tailors functioning of the active message protocol for this message through the parameter returned from the header handler function to the active message protocol, which specifies how to scatter the data into non-contiguous buffers; and
  wherein the active message protocol further comprises an interface to a completion handler function associated with the client process, and wherein the interface to the header handler function further comprises a completion handler execution flaci to be returned by the header handler function to the active message protocol, the completion handler execution flag instructing the active message protocol to execute the completion handler function in a thread of the active message protocol after the active message protocol receives data associated the message, wherein the thread received a last packet of the message.

7. The system of claim 6, wherein the message comprises at least one data packet, and the parameters to be passed further comprise a pointer to the at least one data packet of the message held in a receiver buffer, the pointer facilitating expedited access to the at least one data packet by the client process.

8. The system of claim 6, wherein the completion handler execution flag instructs the active message protocol to execute the completion handler function in the thread if the completion handler execution flag returned has a defined value, and the completion handler execution flag instructs the active message protocol to queue the completion handler function for execution by a separate thread if the completion handler execution flag returned has other than the defined value.

9. The system of claim 6, wherein the instructing comprises instructing the active message protocol to at least one of:
  drop a packet of the message, request retransmission of the packet, and invoke the header handler function upon receipt of the retransmission of the packet; or
  bury a packet of the message and treat the message as having been received with respect to the active message protocol.

10. At least one computer-readable program storage device readable by a computer embodying at least one program of instructions executable by the computer to perform a protocol interface method for interfacing an active message protocol and a client process in a computing environment, the method comprising:
  providing an interface to a header handler function associated with the client process, the interface comprising parameters to be passed from the active message protocol to the header handler function when processing a message received through the active message protocol and a parameter to be returned to the active message protocol from the header handler function in response thereto;
  the parameters to be passed comprising current message state information and current message type information for the message, the current message state information and the current message type information facilitating message-specific decisions by the header handler function about processing data of the message by the active message protocol;
  the parameter to be returned, when received by the active message protocol, instructing the active message protocol on processing the message, the processing of the message being other than just storing the message;
  wherein the instructing comprises instructing the active message protocol how to scatter the data of the message into non-contiguous buffers, the non-contiguous buffers being accessible to the client process, wherein the client process tailors functioning of the active message protocol for this message through the parameter returned from the header handler function to the active message protocol, which specifies how to scatter the data into non-contiguous buffers; and
  wherein the method further comprises providing an interface to a completion handler function associated with the client process, and wherein the interface to the header handler function further comprises a completion handler execution flaci to be returned by the header handler function to the active message protocol, the completion handler execution flag instructing the active message protocol to execute the completion handler function in a thread of the active message protocol after the active message protocol receives data associated the message, wherein the thread received a last packet of the message.

11. The at least one computer-readable program storage device of claim 10, wherein the message comprises at least one data packet, and the parameters to be passed further comprise a pointer to the at least one data packet of the message held in a receiver buffer, the pointer facilitating expedited access to the at least one data packet by the client process.

12. The at least one computer-readable program storage device of claim 10, wherein the completion handler execution flag instructs the active message protocol to execute the completion handler function in the thread if the completion handler execution flag returned has a defined value, and the completion handler execution flag instructs the active message protocol to queue the completion handler function for execution by a separate thread if the completion handler execution flag returned has other than the defined value.

13. The at least one computer-readable program storage device of claim 10, wherein the instructing comprises instructing the active message protocol to at least one of:
 drop a packet of the message, request retransmission of the packet, and invoke the header handler function upon receipt of the retransmission of the packet; or
 bury a packet of the message and treat the message as having been received with respect to the active message protocol.

14. The at least one computer-readable program storage device of claim 10, wherein the instructing further comprises referring the active message protocol to special data-scatter instructions, the special data-scatter instructions specifying how to operate on the data of the message and how the data of the message is to be scatter into the non-contiguous buffers.

* * * * *